Sept. 9, 1947.  R. J. MILLER  2,427,295
MOTION PICTURE PROJECTOR

Original Filed May 1, 1941    3 Sheets-Sheet 1

INVENTOR.
Raymond J. Miller
BY
ATTY.

Sept. 9, 1947.  R. J. MILLER  2,427,295
MOTION PICTURE PROJECTOR
Original Filed May 1, 1941  3 Sheets-Sheet 2

INVENTOR.
Raymond J. Miller
BY
A. E. Wilson
ATTY.

Patented Sept. 9, 1947

2,427,295

UNITED STATES PATENT OFFICE 2,427,295

MOTION-PICTURE PROJECTOR

Raymond J. Miller, Detroit, Mich., assignor to American Pattern and Manufacturing Co., a copartnership consisting of Raymond J. Miller and Alfred E. Wilson, Detroit, Mich.

Original application May 1, 1941, Serial No. 391,258. Divided and this application July 29, 1944, Serial No. 547,163

6 Claims. (Cl. 88—17)

This invention relates to motion picture projectors wherein means are provided to enable the operator to determine the location of the film frames relative to the aperture of the plate.

In the operation of motion picture projectors, independent visual images carried by a strip of film of any suitable material are successively aligned with an aperture in a plate and are projected onto a screen by a light directed through the aperture and film.

To enable the operator to determine the position of a film frame relative to the aperture of the aperture plate, it has been customary to employ a framing light so mounted that it could be moved into the path of the projecting light through the aperture whereby the operator could observe the position of a film frame relative to the aperture to determine whether or not the film was threaded into the projector "in frame." This method of framing has been objectionable because it necessitated an extra operation on the part of the operator to move the framing light into an operative position, and unless carefully manipulated the framing light would not always lie in the same position relative to the aperture whereby inaccuracies of framing might result.

An object of this invention is therefore to provide improved framing means whereby the position of a film frame relative to the aperture may be readily observed.

Yet another object of the invention resides in the provision of a viewer carried by the pressure plate housing and cooperating with a fixed framing light positioned adjacent the aperture of the aperture plate but out of alignment with the path of the projecting light whereby the operator can readily determine the position of a film frame relative to the aperture when threading the projector.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views.

Figure 1:
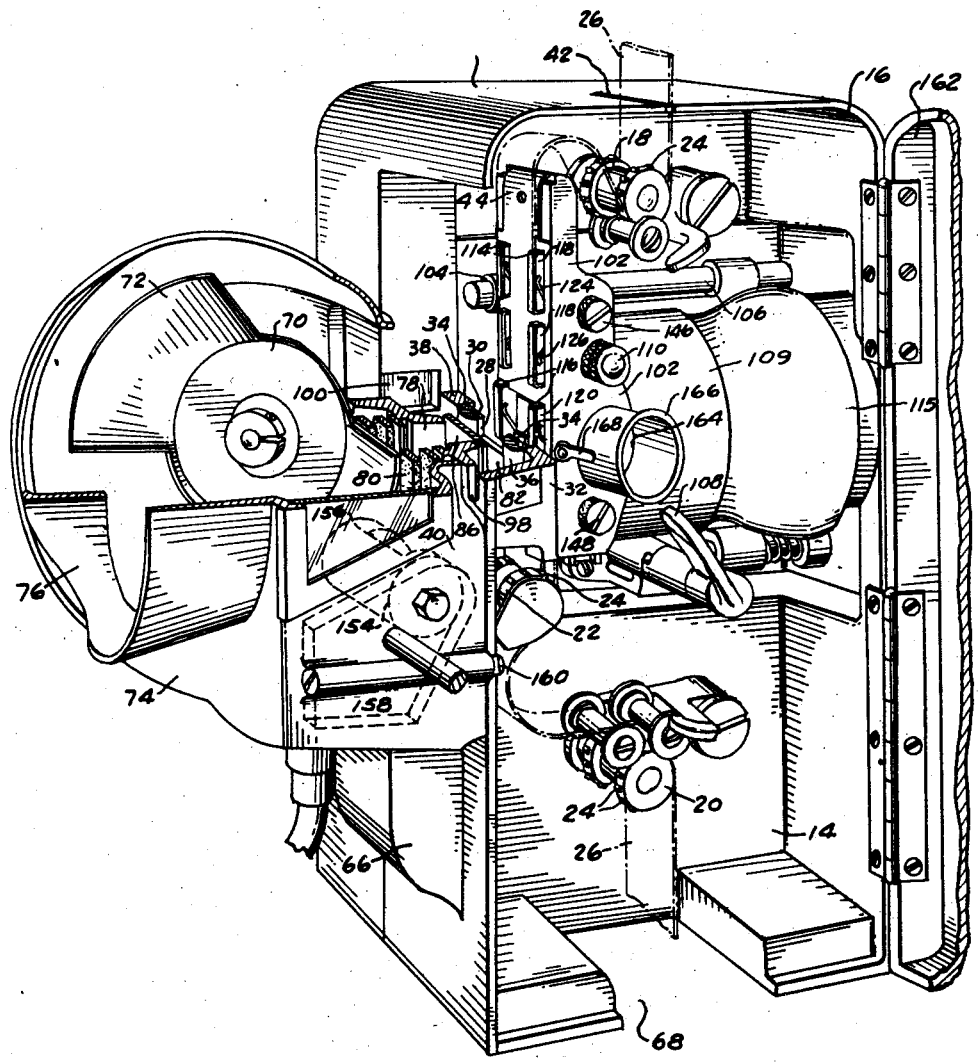
Fig. 1 is a perspective view of a motion picture projector embodying the present invention.
Figure 2:
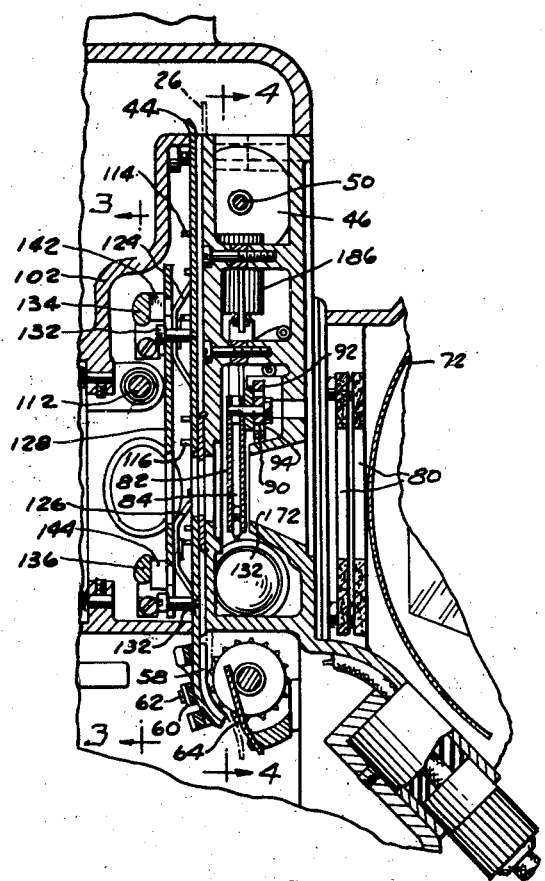
Fig. 2 is a longitudinal sectional view of the projector through the aperture pressure plate.
Figure 3:
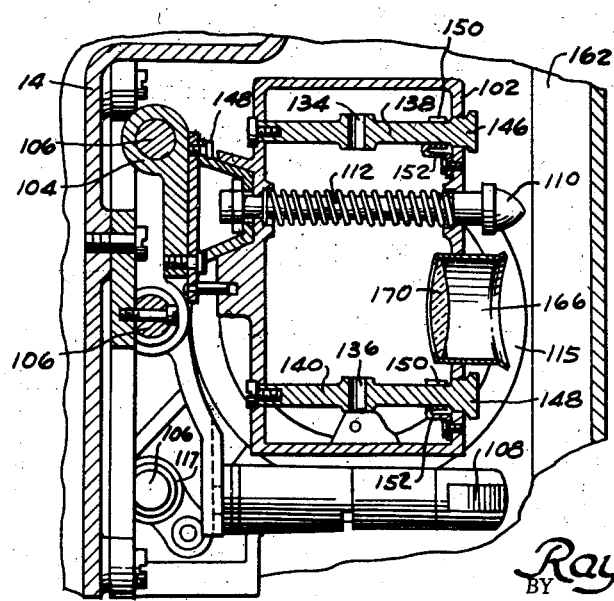
Fig. 3 is a sectional view taken substantially on the line 3—3 of Fig. 2 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawings, it will be observed that the invention is illustrated as being embodied in a motion picture projector having a main casing 12. The space within the casing 12 is preferably divided by a substantially vertically extending intermediate wall 14 into a film compartment 16 and a mechanism compartment.

Upper and lower film driving sprockets 18 and 20 and an intermittently driven sprocket 22 project through the intermediate wall 14 and are provided with radially extending sprocket teeth 24 adapted to engage within spaced apertures in film 26 to drive it. The sprockets 18 and 20 are driven by suitable gearing in the mechanism compartment to move the film at a substantially predetermined speed. The intermittently driven sprocket 22 is driven from the mechanism compartment by a suitable intermittence driving mechanism to momentarily align successive film frames with an aperture 28 formed in an aperture plate 30 carried by an aperture plate housing 32.

The aperture plate 30 is preferably supported between film tracks 34 and film track carrier 36 aligned with the aperture plate housing 32 and with a wall 38 extending transversely from the intermediate wall 14 and spaced forwardly from a back wall 40 of the main casing 12.

The film 26 is drawn into the film compartment 16 through a slot 42 formed in the upper wall of the casing 12 by the upper film driving sprocket 18. After leaving the sprocket 18 the film is directed over the top of a shoe guide plate 44 between film guide rollers 46 and 48 mounted on a shaft 50 carried by bosses 52 and 54 associated with the aperture plate housing 32. The film 26 is then intermittently moved downwardly by the intermittently driven sprocket 22 to momentarily align successive film frames with the aperture 28.

The film 26 is maintained in contact with the sprocket teeth 24 of the intermittently driven sprocket 22 by a film tension shoe 56 which comprises an intermittence sprocket shoe 58 so proportioned as to follow the general contour of the intermittently driven sprocket 22 and maintain the film in engagement with the sprocket teeth 24. Means such for example as a spring 60 may be provided to yieldingly urge the intermittence sprocket shoe 58 towards the intermittently driven sprocket 22 to exert sufficient pressure on the film 26 to prevent disengagement of the film from the sprocket teeth 24. The spring 60 may be adjustably mounted on a screw 62 threaded into the film shoe guide plate 44 whereby the pressure exerted on the film by the intermittence sprocket shoe 58 can be varied to maintain the film under a desired tension. A stripper plate 64 may be provided to prevent the film 26 from winding up on the sprocket 22 in the event of film breakage.

After leaving the sprocket 22 the film preferably forms a backwardly directed loop extending into an outwardly flared portion 66 of the back wall 40. The film is then directed over the lower film driving sprocket 20 and is discharged from the film compartment 16 through an opening 68 preferably communicating with a sound head.

Projecting light is directed towards the aperture 28 from a suitable light source preferably positioned behind the projector. A shutter of any suitable form such for example as a rotatable member 70 having angularly inclined blades 72 may be provided to intermittently interrupt the flow of projecting light into the film compartment 16 to prevent streaking as successive frames of the film 26 are moved into alignment with the aperture 28 and to prevent visible flicker. The shutter is mounted in a housing 74 having a back light admission port 76 aligned with an inwardly directed baffle 78 formed in the back wall 40.

Suitable heat shields 80 preferably positioned between the shutter and the back wall 40 of the casing 12 may be provided to retard the flow of heat from the projecting light into a cooling chamber 82. A movable fire valve 84 may be provided to lie between a front light admission port 86 adjacent the forward end of the baffle 78 and the aperture 28 to interrupt the flow of projecting light when the projector is not operating at a desired substantially predetermined speed.

The fire valve 84 may be carried by a shaft 88 having a pinion 90 meshing with a rack 92 actuated by speed controlled means driven from the mechanism compartment to maintain the fire valve 84 in the open or unobstructing position when the projector is operating at a substantially predetermined speed. The fire valve 84 may also be manually actuated by a rack 94 controlled by a plunger 96 suitably positioned in the film compartment 16.

The cooling chamber 82 preferably communicates with atmosphere on opposite sides of the aperture plate 30 and film track carriers 36 through inlet ports 98 formed in the back wall 40 and outlet ports communicating with the cooling chamber 82 through a manifold passage 100, and an impeller preferably driven by the rotatable member 70 of the shutter.

The shoe guide plate 44 is mounted in a pressure plate housing 102 mounted on a carrier arm 104. The carrier arm 104 is slidably mounted on a plurality or vertically spaced generally horizontally disposed rods 106 extending longitudinally in the film compartment 16 and attached to the intermediate wall 14.

Motion transmitting means controlled by a lever 108 positioned between the housing 102 and a fixed portion of the projector may be provided to move the pressure plate housing 102 and the pressure shoe guide plate 44 away from the aperture plate 30 and film tracks 34 to enable the operator to thread film into the projector. A telescoping light shield in the form of a ring 109 mounted on studs 111 carried by the housing 102 may be yieldingly urged by springs 113 towards a lens tube 115 to enable the housing 102 to separate from the aperture plate to permit the operator to thread film into the projector and to facilitate removal of the pressure plate housing from the film compartment. The lens tube 115 is supported on a plurality of the vertically spaced horizontally extending rods 106 by a lens tube carrier arm 117.

A knob 110 carried by a locking shaft 112 may be provided to project through the pressure plate housing 102 to enable the operator to readily remove the pressure plate housing 102 and shoe guide and pressure plates from the carrier arm 104 to clean or adjust them.

A plurality of vertically spaced relatively small film engaging shoes 114 and 116 may be provided to yieldingly urge the film 26 into engagement with the film tracks 34 to maintain the film in a substantially predetermined spaced relation relative to the aperture 28. The film engaging shoes 114 and 116 project through slots 118 and 120 formed in the shoe guide plate 44 and are provided with laterally extending projections which prevent the shoes from passing completely through the slots 118 and 120.

Means may be provided to vary the pressure exerted on the film by each of the film engaging shoes. One illustrative example of a mechanism for varying the pressure exerted by spaced shoes comprises a pressure plate 128 floatingly mounted relative to the shoe guide plate 44 and having independent vertically spaced springs such as those illustrated at 124 and 126 interposed between the pressure plate 128 and each of the film engaging shoes 114 and 116. The springs 124 and 126 may be operably connected to the pressure plate 128 by suitable screws 130. The pressure plate 128 is thus resiliently mounted on the shoe guide plate 44 and is guided by screws 132 in such a manner that the pressure plate can vary its position angularly to equalize the pressure exerted by the springs on each side of the shoe guide plate 44.

Means may be provided to independently vary the pressure exerted on the film by the vertically spaced film engaging shoes 114 and 116. One desirable form of such pressure varying means comprises cam members 134 and 136 carried by vertically spaced shafts 138 and 140 journalled in the pressure plate housing 102 and engaging vertically spaced cam followers 142 and 144 carried by the pressure plate 128. The shafts 138 and 140 project beyond the outer edge of the pressure plate housing 102 and are provided with knobs 146 and 148 whereby they may be independently rotated to vary the pressure exerted by the vertically spaced shoes 114 and 116. The shafts 138 and 140 may be formed with serrated end portions 150 adapted to be engaged by a spring pressed locking clip 152 to prevent the shafts from rotating to vary the pressure exerted on the shoes until subjected to a substantially predetermined manual rotating force.

Attention is called to the fact that the unsprung weight of the film engaging shoes 114 and 116 is minimized because a relatively large number of relatively small and light shoes are employed. Each of the shoes is yieldingly urged towards the film tracks 34 by its individual spring so that any disturbance caused by the film is not transmitted to the next shoe. Such disturbance of the film may be caused by a variation in thickness of film or by the presence of a splice in the film where two pieces of film have been joined together. When this splice passes through between the film engaging shoes and the film tracks it is necessary for the shoes to move away from the tracks to allow the splice to pass. Thus it will be seen that if the unsprung weight of the film engaging shoes is low they will recover their original position more rapidly than if the unsprung weight of the shoes were high. Also, it will allow the patch to pass through with less resistance since the inertia is low. It will be noted that only one pair of shoes is effected at a time by the patch while the remaining shoes are performing their function uninterrupted. This all goes to produce a steadier alignment of the film resulting in a minimum disturbance of the picture on the screen.

It will be noted that it is possible to vary the pressure exerted on the film by the upper and lower film engaging shoes 114 and 116 respectively. For example, the lower shoes 116 positioned closer to the intermittently driven sprocket 22 may be adjusted to exert greater pressure on the film 26 than the upper film engaging shoes 114 to give more stabilized control of the film.

Means maintained in a fixed relation relative to the projector may be provided to enable the operator to observe the position of a film frame relative to the aperture 26 to determine whether the film is threaded into the projector "in frame."

One desirable form of such framing means comprises a framing light maintained in a fixed position out of alignment with the path of the projecting light, and a viewing port positioned on the opposite side of the aperture 28 whereby the position of the frame lines of the film relative to the aperture defining marginal walls of the aperture plate can be observed by the operator.

As illustrated in Fig. 1, a framing light may be provided in a housing 154 located outside of the main casing 12 of the projector and out of the path of the projecting light through the shutter housing 74. The framing light housing 154 is provided with a cutout portion 156 directed towards the aperture 28. The framing light housing 154 is provided with a cutout portion 156 directed towards the aperture 28. The framing light positioned in the housing 154 may be of any suitable type such for example as an electric light and may be controlled by a switch 158 having a plunger 160 preferably positioned adjacent the back wall 40 so as to be actuated by the marginal edge of a door 162 hinged to the main casing 12. The switch 158 is operably connected with the framing light in such a manner that when the door 162 is in the position to close the film compartment 16, the framing light is off. When the door 162 is opened the plunger 160 of the switch 158 moves longitudinally to actuate the switch and close the electrical contacts to light the framing light positioned in the housing 154.

A viewing port 164 may project through the wall of the pressure plate housing 102 in alignment with the aperture 28 and the cutout portion 156 of the housing 154 whereby the light rays from the framing light may project through the cutout portion 156, aperture 28 and film to enable the operator to observe whether the film is threaded "in frame" with reference to the aperture 28.

Figure 5:
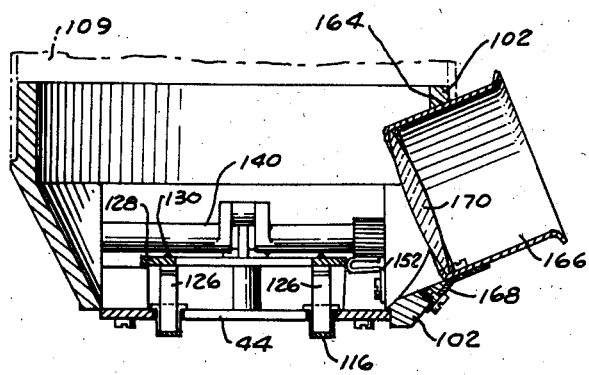
Fig. 5 is a sectional view through the pressure plate housing at the eye piece looking downwardly.

As more clearly illustrated in Fig. 5, the viewing port 164 may comprise an eye piece 166 projecting through the pressure plate housing 102 and suitably attached thereto as by means of a clamp 168. If desired, the eye piece 166 may be provided with a lens 170 of suitable proportions such for example as a bi-convex lens to magnify the aperture 28 to magnify the image of the viewed frame.

Figure 6:
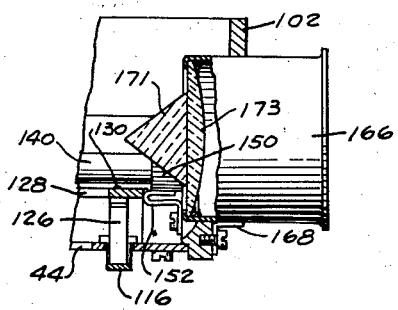
Fig. 6 is a view similar to Fig. 5 showing a modified form of viewer.

Referring now to Fig. 6, it will be observed that if desired a prism 171 may be provided to collect light from the rectangular shaped aperture 28 and direct it to a lens 173 preferably of the plano-convex type whereby the view of the image of the film frame is extended and magnified to bring it to a position more convenient for the operator to check.

Figure 4:
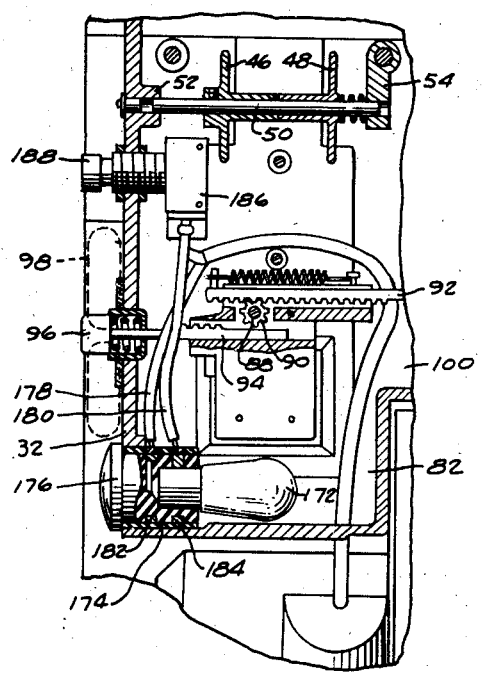
Fig. 4 is a part sectional view taken substantially on the line 4—4 of Fig. 2 looking in the direction of the arrows.

In the embodiment of the invention illustrated in Fig. 4 a framing light is positioned within the cooling chamber 82 out of alignment with the projecting light. This framing light comprises an electric light bulb 172 mounted in a socket 174. The socket 174 preferably has a knurled knob 176 extending through the wall of the aperture plate housing 32 whereby the socket may be readily removed to replace burned out bulbs. Electric current is supplied to the bulb 172 through suitable wires 178 and 180 operably connected to metal rings 182 and 184 respectively connected with the contact points of the bulb 172.

The wire 180 is preferably connected with a switch 186 having a plunger 188 positioned to be actuated by the door 162 to extinguish the framing light when the door is in the position to close the film compartment 16.

Attention is called to the fact that when the door 162 of the film compartment 16 is opened the framing light 172 is automatically turned on whereby the operator can observe the position of the spaced frames of the film through the viewing port 164. With the embodiment of the invention illustrated in Fig. 4 it is not necessary to hold the fire valve 84 open because the framing light is positioned at such an angle as to project through the aperture 28 even though the fire valve 84 is in the position to close the front light admission port 86 formed in the shutter housing 74 adjacent the end of the inwardly directed baffle 78. The operator thus has both hands free to position the film in the proper position with reference to the film guiding and driving means and to manipulate the aperture pressure plate.

Means may be provided to mount the pressure plate housing 102 on the housing carrier arm 104 in such a manner that it may be adjusted vertically and horizontally to properly align it with the aperture plate housing 32.

This is a division of my co-pending application Serial No. 391,258, filed May 1, 1941, now Patent No. 2,374,828, issued May 1, 1945, which was a continuation in part of my earlier filed application Serial No. 250,310, filed January 11, 1939, now Patent No. 2,312,663, issued March 2, 1943.

I claim:

1. In a motion picture projector, a housing having a film compartment including a back wall having a light admission port, an access door for the film compartment, an aperture plate housing spaced from and cooperating with the back wall to provide a cooling chamber for the dissipation of heat from the projection light, an aperture plate having a film projecting aperture in alignment with the light admission port in the back wall, a fire shutter adapted to be interposed between the light admission port and the film projecting aperture when the projector is not running, a film pressure plate housing positioned forwardly of the aperture plate and movable between operating and threading positions adjacent and spaced from the aperture plate, means carried by the film pressure plate housing to yieldingly urge film into engagement with the aperture plate, a framing device comprising a framing light positioned in the cooling chamber out of alignment with the light admission port in the back wall, a viewing port in the film pressure plate housing in alignment with the aperture in the aperture plate and the framing light when the film pressure plate housing is in the threading position and the fire shutter is positioned between the light admission port and the film projecting aperture, and a switch actuated by opening of the access door to light the framing light.

2. In a motion picture projector adapted to project independent visual images from a plurality of successively spaced film frames, a housing having a back wall including a light admission port, a plate having an aperture therein positioned forwardly from the back wall, a cooling chamber between said plate and the back wall, a fire shutter interposed between the light admission port and the aperture in said plate and movable between open operative and closed inoperative positions, means to momentarily align successive film frames with the aperture, a framing device comprising a readily removable framing light located in a substantially fixed position in the cooling chamber out of alignment with the path of the projecting light, manually operable means whereby the framing light may be readily removed from the housing for repair or replacement, and a viewing port positioned forwardly of the aperture plate in alignment with the framing light and aperture when the fire shutter is in the closed inoperative position whereby the position of film frames relative to the aperture can be observed.

3. In a motion picture projector, a casing including a back wall having a light admission port and an access door cooperating to form walls of a film compartment, an aperture plate and an aperture plate housing spaced from the back wall, a cooling chamber between the back wall and the aperture plate housing, a framing light positioned in said cooling chamber out of alignment with the light admission port of the back wall and the aperture of the aperture plate, a film pressure plate housing in the film compartment movable between positions adjacent and spaced from the aperture plate to permit threading film into the projector, a viewing port in the film pressure plate housing to align with the framing light and the aperture of the aperture plate when the housing is spaced from the aperture plate to permit threading film into the projector, and means including a door actuated switch to light the framing light when the access door of the film compartment is opened.

4. In a motion picture projector, a main casing comprising a back wall having a light admission port, an access door, a film compartment within the main casing, an aperture plate spaced from the back wall and having an aperture aligned with the light admission port in the back wall, a framing device comprising a housing positioned behind the back wall of the main casing and having a cut out portion through the back wall out of alignment with the light admission port of the back wall and the aperture in the aperture plate, a framing light in said housing, a film pressure plate housing movable between positions adjacent and spaced from the aperture plate, a viewing port positioned in the pressure plate housing to align with the framing light and aperture when the pressure plate housing is moved to the position spaced from the aperture plate, and a door actuated switch to light the framing light when the access door is opened.

5. In a motion picture projector, a housing having a film compartment including a back wall having a light admission port, a wall spaced from the back wall and cooperating therewith to provide a cooling chamber for the dissipation of heat from a projection light, an aperture plate having a film projecting aperture in alignment with the light admission port in the back wall, a fire shutter adapted to be interposed between the light admission port and the film projecting aperture when the projector is not running, a film shoe pressure plate housing positioned forwardly of the aperture plate and movable between operating and threading positions adjacent and spaced from the aperture plate, means carried by the film shoe pressure plate housing to yieldingly urge film into engagement with the aperture plate, a framing device comprising a framing light positioned in the cooling chamber out of alignment with the light admission port in the back wall, a viewing port in alignment with the framing light in the cooling chamber and visible from the film compartment when the film shoe pressure plate housing is in the threading position and the fire shutter is positioned between the light admission port and the film projecting aperture to determine the relative position of a film frame relative to the film projecting aperture.

6. In a motion picture projector, a housing having an intermediate wall dividing the space within the housing into film and mechanism compartments, an aperture plate in the film compartment, a film shoe aperture plate housing in the film compartment forwardly of the aperture plate and movable between operating and film threading positions with reference to the aperture plate, a cooling chamber positioned behind the aperture plate, a framing light positioned in the cooling chamber out of alignment with the aperture of the aperture plate, and a film frame viewing port aligned with the framing light to indicate the framing position of a film frame relative to the aperture of the aperture plate when the film shoe aperture plate housing is in the threading position relative to the aperture plate.

RAYMOND J. MILLER.

REFERENCES CITED

The following references are of record in the file of this patent:

UNITED STATES PATENTS

| Number | Name | Date |
|---|---|---|
| 1,489,332 | Outrey | Apr. 8, 1924 |
| 1,580,969 | Dina | Apr. 13, 1926 |
| 1,753,647 | Dina | Apr. 8, 1930 |
| 1,845,490 | Dina | Feb. 16, 1932 |
| 1,958,475 | Frappier et al. | May 15, 1934 |
| 2,101,934 | Fassin | Dec. 14, 1937 |

FOREIGN PATENTS

| Number | Country | Date |
|---|---|---|
| 333,988 | Germany | June 11, 1919 |
| 462,884 | Germany | July 19, 1928 |